Figure 1:
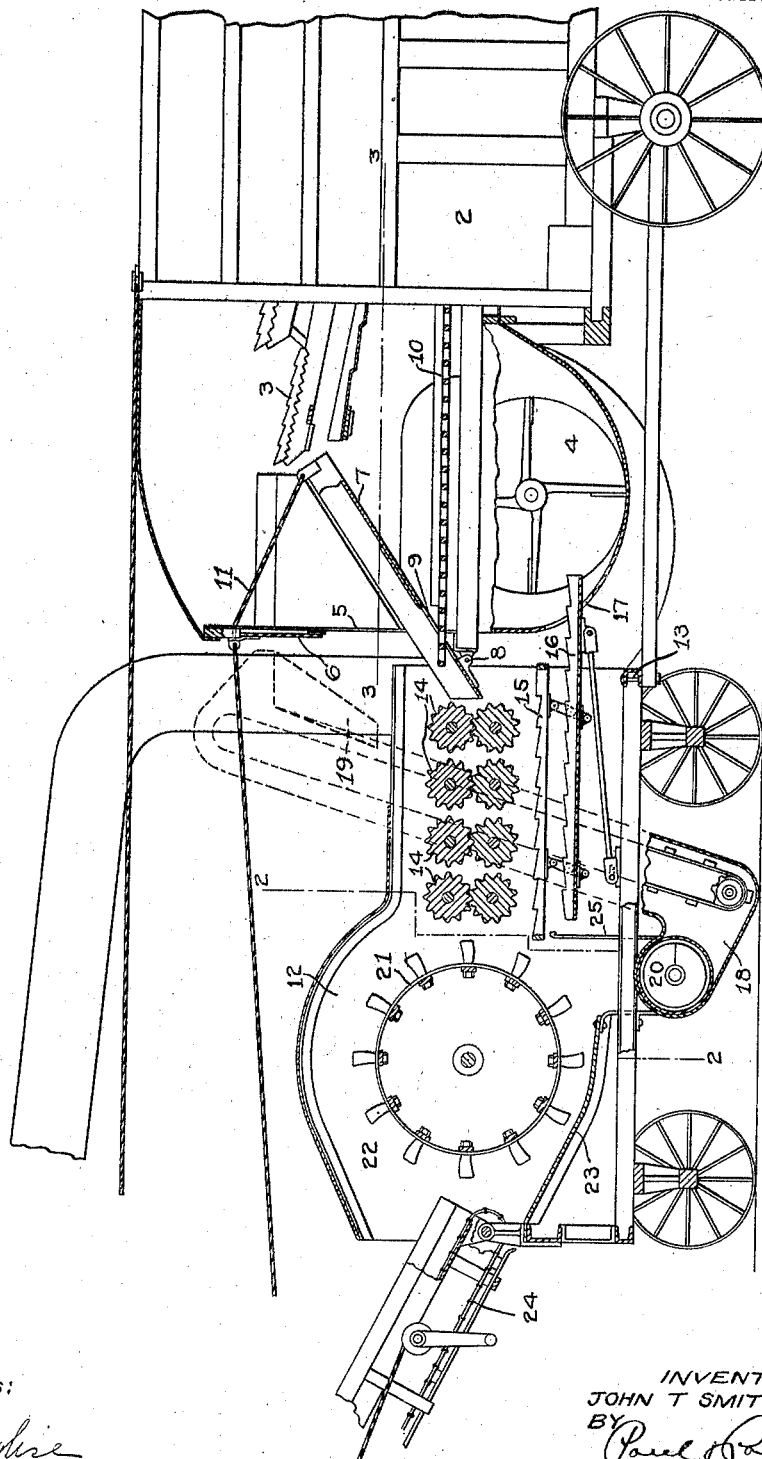

J. T. SMITH.
ATTACHMENT FOR THRESHING MACHINES.
APPLICATION FILED SEPT. 26, 1917.
1,302,867.
Patented May 6, 1919.
2 SHEETS—SHEET 2.
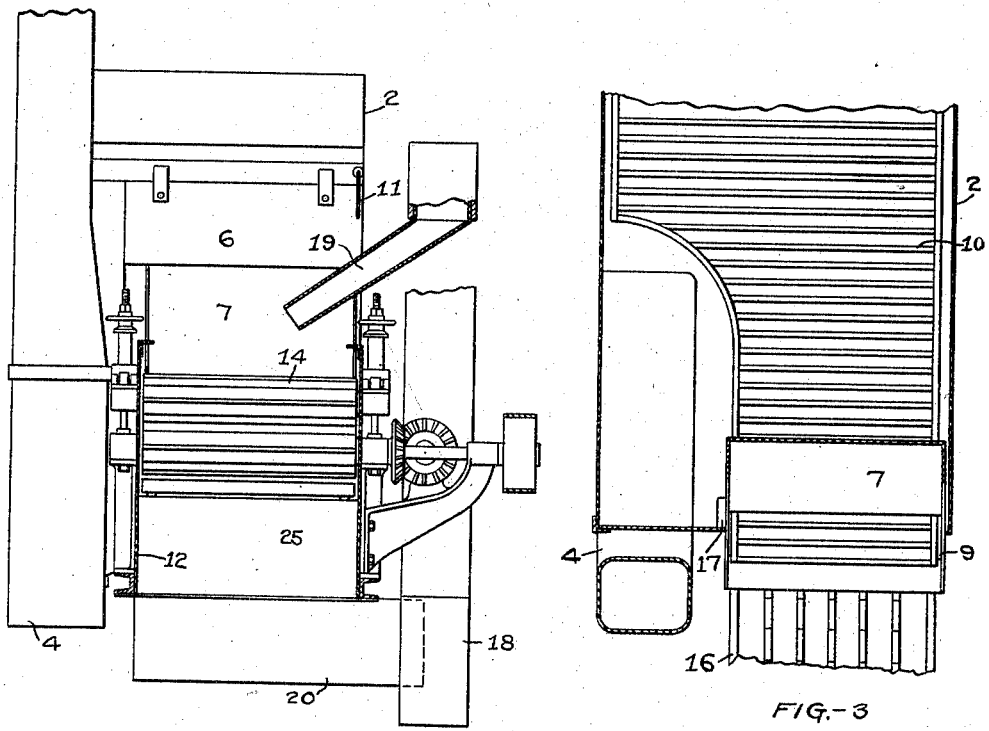
FIG.-2
FIG.-3
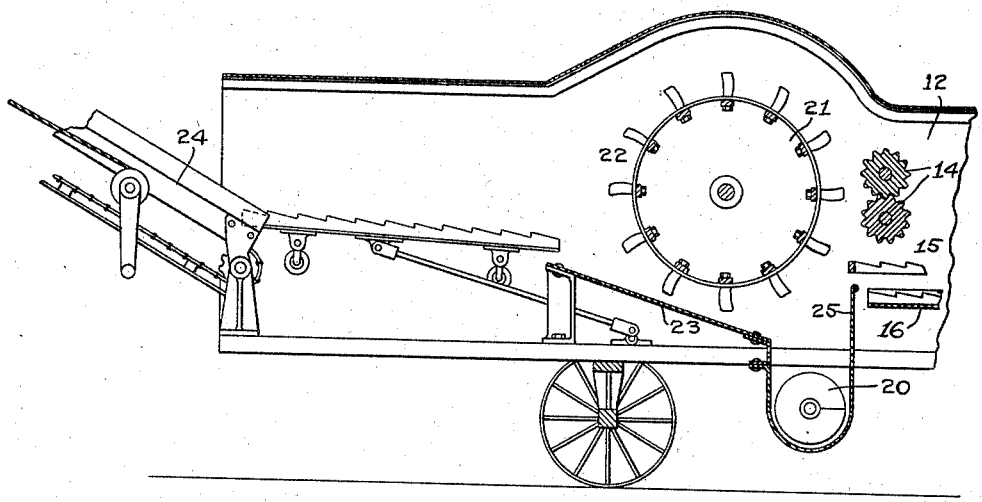
FIG.-4
WITNESSES:
B. G. Hall
M. R. Delighise
INVENTOR:
JOHN T. SMITH
BY
Paul & Paul
ATTORNEYS

UNITED STATES PATENT OFFICE.

JOHN T. SMITH, OF HOPKINS, MINNESOTA.

ATTACHMENT FOR THRESHING-MACHINES.

1,302,867.  Specification of Letters Patent.  Patented May 6, 1919.

Application filed September 26, 1917. Serial No. 193,244.

*To all whom it may concern:*

Be it known that I, JOHN T. SMITH, a citizen of the United States, resident of Hopkins, county of Hennepin, State of Minnesota, have invented certain new and useful Improvements in Attachments for Threshing-Machines, of which the following is a specification.

The object of my invention is to provide a threshing machine attachment by means of which clean straw may be taken from the straw rack and delivered to the brake rolls, while the chaff and other fine material is subjected to a further separation to remove the grain therefrom before delivery to the blower.

A further object is to provide an attachment wherein the straw, after passing through the brake rolls, may be subjected to the action of a picker for a further separation of the grain before delivery outside the machine.

The invention consists generally in various constructions and combinations, all as hereinafter described and particularly pointed out in the claims.

In the accompanying drawings forming part of this specification,

Figure 1 is a vertical sectional view through a portion of a threshing machine and its attachment applied thereto, Fig. 2 is a transverse sectional view on the line 2—2 of Fig. 1, Fig. 3 is a sectional view on the line 3—3 of Fig. 1, Fig. 4 is a vertical sectional view through that portion of the machine which receives the straw after passing the brake rolls.

In the drawing, 2 represents a threshing machine of ordinary construction, having a straw rack 3 and a blower hopper 4. The end wall of the machine casing has an opening 5 therein, with a suitable door 6 therefor and a slide 7 is hinged at 8 on the machine casing and has one end projecting through said opening and its opposite end in position to receive the clean straw from said rack, said slide being inclined downwardly from said rack to direct the straw therefrom through the opening in the casing of the machine. The slide preferably has an opening 9 in the bottom thereof and a chaffer 10 is arranged horizontally beneath the straw rack and above the blower and has one end projecting through the said opening in the slide, so that the fine material falling through the rack upon the chaffer may be directed outwardly over the blower and discharged by the chaffer upon the lower end of the slide. The slide is adjustable by means of a suitable cable 11 attached to the upper end thereof and passing outwardly through the wall of the machine casing.

12 represents the machine casing, having an open end arranged to abut the end wall of the threshing machine casing and attached thereto by suitable means, as at 13. Within this casing are a series of brake rolls 14 arranged in pairs, one above the other, and adjacent the discharge end of the slide 7, so that the straw passing down said slide will be engaged by the forward brake rolls and be fed between them, passing through from one set of rolls to the other. Beneath the brake rolls I provide reciprocating straw racks 15 and 16 mounted to operate simultaneously in the usual way, the rack 16 having one end projecting through an opening 17 in the blower hopper for discharging fine material, such as chaff and the like, therein. Any material which falls through the rack 15 drops upon the rack 16 and is carried back through the opening 17 to the blower. The coarser material which does not drop through the rack 15 is discharged over the partition 25 into the transverse spiral conveyer 20 from whence it is delivered to the elevator 18 and discharged through the spout 19 upon the top of the brake rolls. From the brake rolls the crushed straw passes to a picker 21 mounted to revolve within a chamber 22 having an inclined floor 23 over which the seeds and fine material separated from the straw by the action of the picker passes to the conveyer 20 and the elevator to be returned to the brake rolls. After leaving the picker, the crushed and separated straw is delivered to an upwardly inclined conveyer 24 for transportation to a bailing press or any other suitable point outside the machine. I am therefore able to effect a complete separation of the clean straw from the chaff and by raising the slide 7 I may allow the straw to pass with the chaff into the blower beneath which, as shown in Fig. 3, is preferably located at one side of the chaffer and has an inclined floor for guiding the fine material from the chaffer to the blower.

I claim as my invention:

1. In a threshing machine, the combination with a straw rack, a chaffer horizontally mounted beneath the same and a blower arranged beneath said chaffer to receive the chaff and fine material therefrom, of a feed plate hinged at the discharge end of said chaffer and overhanging the same in position to receive the clean straw from said rack and divert it from said chaffer, a series of crushing rolls mounted at the end of said chaffer in position to receive the clean straw from said feed plate, said plate being mounted to swing to an upright position and allow the mingled chaff and straw to fall upon said chaffer from said rack, and a picker mounted to receive the straw from said crushing rolls.

2. In a threshing machine, the combination, with a straw rack, a chaffer horizontally mounted beneath the same and a blower mounted beneath said chaffer, of a feed plate hinged near the end of said chaffer and having an opening in the floor thereof to receive the opposite end of said chaffer and projecting above said chaffer to a point beneath and near the discharge end of said straw rack to receive the clean straw therefrom, the fine material passing down through said chaffer to said blower and the coarser material passing over said chaffer through an opening in said feed plate to the discharge end thereof, and cushing rolls mounted to receive the straw and coarse material from said feed plate and said chaffer.

3. In a threshing machine, the combination, with a straw rack, a chaffer horizontally mounted beneath the same, and a blower arranged beneath said chaffer to receive the chaff and fine material therefrom, of a feed plate hinged at the discharge end of said chaffer and overhanging the same in position to receive the clean straw from said rack and divert it from said chaffer, a series of crushing rolls mounted at the discharge end of said chaffer in position to receive the clean straw from said feed plate, said plate being mounted to swing to an upright position and allow the mingled chaff and straw to fall upon said chaffer from said rack and said chaffer being mounted to discharge the material that is too coarse to fall therethrough into said crushing rolls.

In witness whereof, I have hereunto set my hand this 19" day of September, 1917.

JOHN T. SMITH.

Copies of this patent may be obtained for five cents each, by addressing the "Commissioner of Patents, Washington, D. C."